United States Patent [19]
Gerads et al.

[11] Patent Number: 6,122,982
[45] Date of Patent: Sep. 26, 2000

[54] FLEXIBLE LINK VARIABLE STROKE APPARATUS

[75] Inventors: Lyle J. Gerads, Clearwater; Robert Fetrow, Fridley; Kevin Dodds, Plymouth, all of Minn.

[73] Assignee: Zero-Max, Inc., Minneapolis, Minn.

[21] Appl. No.: 09/271,798

[22] Filed: Mar. 18, 1999

[51] Int. Cl.[7] .................................................. F16H 29/00
[52] U.S. Cl. ............................................................. 74/125.5
[58] Field of Search ............................ 74/117, 118, 125.5

[56] References Cited

U.S. PATENT DOCUMENTS

| | | |
|---|---|---|
| 2,950,623 | 8/1960 | Weber et al. . |
| 3,004,440 | 10/1961 | Pernik ........................................ 74/117 |
| 3,340,743 | 9/1967 | Stageberg . |
| 3,714,837 | 2/1973 | Jensen et al. ........................... 74/125.5 |
| 4,091,684 | 5/1978 | Lehmann . |
| 4,112,778 | 9/1978 | Korosue . |
| 4,242,050 | 12/1980 | Oakes . |
| 5,771,743 | 6/1998 | Menzi . |

FOREIGN PATENT DOCUMENTS

| | | |
|---|---|---|
| 0133187 | 2/1985 | European Pat. Off. . |
| 1201921 | 1/1960 | France . |

*Primary Examiner*—Dirk Wright
*Attorney, Agent, or Firm*—Merchant & Gould P.C.

[57] ABSTRACT

The present disclosure relates to a flexible link drive apparatus having a housing rotationally supporting an eccentric input shaft and an output shaft. An eccentric roller assembly is coupled to the eccentric input shaft, and the eccentric roller assembly comprising at least one input roller. Additionally, a clutch member is coupled to the output shaft. The present disclosure further relates to a flexible connection member that has a fixed end coupled to the housing through a flexible connection member anchor, and a free end coupled to the housing through a biasing member. The input roller intermittently contacts the flexible connection member and rotates the clutch member and the output shaft. The coupling of the free end of the flexible connection member to the housing by the biasing member causes a greater angle of travel for the clutch member and produces a greater output shaft rotation.

20 Claims, 7 Drawing Sheets

FLEXIBLE LINK VARIABLE STROKE APPARATUS

TECHNICAL FIELD

This invention generally relates to an apparatus for mechanically adjusting the output speed of a flexible link variable stroke drive. More particularly, this invention relates to a flexible link variable stroke drive that has an adjustable range of output speeds from a constant input speed.

BACKGROUND

Variable stroke drives are used on a wide variety of machinery. A variable stroke drive may be used as a primary or secondary drive apparatus on various applications, for example, in the agricultural, metalworking, packaging, paper converting, sewing, and material handling industries.

In the textile industry, loom manufacturers use variable stroke drives as let-off mechanisms. The variable stroke drive controls the speed at which warp yarns are released. Further, the variable stroke drive maintains constant tension on the yarns and, in effect, eliminates the need for a separate motor on the loom. Another example of an application for the variable stroke drive is in the food processing industry. A variable stroke drive may be used on a food press machine. The variable stroke drive controls the speed of a conveyor that proportions, forms, and stacks food products on a conveyor assembly. A further example of an application for a variable stroke drive is in the printing industry. Variable stroke drives may be used to control a high speed sheeter that controls the speed of stacking finished sheets after printing, and a separate variable stroke drive controls the cut-to-length of the paper sheets. Another example of an application for a variable stroke drive is on a grain dryer. The variable stroke drive controls the auger speed that circulates grain for proper, uniform drying.

There are numerous patents that disclose the concept of a variable speed power transmission apparatus. Two examples of variable stroke drives are shown in U.S. Pat. No. 2,950,623 (the '623 patent), issued to J. A. Weber, et al., and U.S. Pat. No. 3,340,743 (the '743 patent) issued to S. O. Stageberg.

The '623 patent discloses a drive mechanism having an input shaft that carries a crank arm. A first end of a chain is attached to the crank arm. Additionally, a first end of a spring is attached to the crank arm. The chain passes around a gear that is attached to an output shaft through a one-way clutch that includes a ratchet wheel and a pawl. The second end of the chain is attached to a second end of a spring. The spring wraps around a groove of a pulley member. The driving of the input shaft is intermittent and the amount of rotating may be controlled by the position of attachment on the crank arm to make longer or shorter the effective length of the crank arm in its operation of the driving mechanism of the invention. This invention discloses a variable eccentric that does not allow for greater output speed and output torque capabilities. Further, the patent discloses a constant driving mechanism with no new speed capacity. In addition, the '623 system is not capable of being adjusted while the input shaft is rotating, and it is an incremental indexing drive system and not a variable speed drive. Moreover, the '623 system does not provide a greater ratio of input to output speed to the extent that an overdrive is obtained.

The '743 patent discloses a variable speed power transmission. In this device, there are several belts or links. A single eccentric is mounted on an input shaft. The output shaft is connected to an overriding clutch. The device includes an arm that is usable to vary the amount of contact between the eccentric and belt or belts. A single eccentric comes into integral contact with a belt that urges a clutch disk to a first position to move an output shaft. A spring is connected directly to a clutch disk to return the clutch disk to an original position. The spring assembly is directly connected to the clutch disk. This arrangement creates a diminished angle of travel for the clutch disk, and in accord, this produces a lesser output shaft rotation. The '743 patent discloses a single eccentric with a 90° phase angle differential between eccentrics. The single eccentric utilized transmits a relatively low speed to the output shaft. Further, the system of the '743 patent does not utilize a free-floating spring assembly in order to provide greater speed range for industrial applications. Moreover, the '743 system does not provide a greater ratio of input to output speed to the extent that an overdrive is obtained.

Therefore, a need exists for an improved apparatus that is capable of having a greater input to output ratio of rotation. A need exists for an improved apparatus that offers the capability of obtaining zero speed while the apparatus is operational. A related need is an apparatus that can be adjusted while the apparatus is operational or idle. A related need exists for a fixed length eccentric that utilizes a dual-eccentric transmission unit. Further, there is a need for a dual-eccentric transmission unit that has a 45° phase angle differential between eccentric units. Last, there is a need for a free-floating spring assembly in order to provide greater speed ratio for industrial applications.

SUMMARY OF THE INVENTION

In one embodiment, the present invention comprises a flexible link drive apparatus having a housing rotationally supporting an eccentric input shaft and an output shaft. An eccentric roller assembly is coupled to the eccentric input shaft, and the eccentric roller assembly comprises at least one input roller. Additionally, a clutch member is coupled to the output shaft. Further, a flexible connection member has a fixed end coupled to the housing through a flexible connection member anchor and a free end coupled to the housing through a biasing member. The input roller intermittently contacts the flexible connection member and rotates the clutch member and the output shaft. The coupling of the free end of the flexible connection member to the housing by the biasing member causes a greater angle of travel for the clutch member and produces a greater output shaft rotation.

In another embodiment otherwise similar to the first embodiment, the eccentric roller assembly comprises at least two input rollers.

A further embodiment includes a flexible link drive apparatus having a housing with a first endplate, a second endplate, and an encasing plate. An eccentric input shaft and output shaft are mounted between the first and second endplates. A plurality of eccentric roller assemblies are coupled to the eccentric input shaft, and each of the eccentric roller assemblies have at least two diametrically opposed rollers. A plurality of clutch members are coupled to the output shaft. Further, a plurality of flexible connection members are coupled to a flexible connection member anchor and a plurality of biasing members are coupled to a biasing member anchor. The flexible connection members are in communication with the input rollers and the clutch members for variably rotating the output shaft. Moreover, a speed control device comprises a control shaft operatively connected to a control yoke, a cross shaft disposed within the control yoke, and a flexible connection member being pivotally coupled to the cross shaft. The rotation of the control shaft alters the relative position of the speed control device in relation to the eccentric input roller.

BRIEF DESCRIPTION OF THE DRAWINGS

The organization and manner of the structure and operation of the invention, advantages thereof, may best be understood by reference to the following description, taken in connection with the accompanying drawings, wherein like reference numerals identify like elements throughout the views, in which.

DETAILED DESCRIPTION OF THE PREFERRED EMBODIMENT

In the description of the preferred embodiment, reference is made to the accompanying drawings that form a part hereof and in which is shown by way of illustration a specific embodiment in which the invention may be practiced. It should be understood that other embodiments may be utilized as structural changes may be made without departing from the scope of the present invention.

In general terms, the present system is directed to a flexible link variable stroke drive that has an adjustable range of output speeds. One embodiment includes a dual-eccentric roller flexible link drive with a free-floating biasing member in order to provide an enhanced input-to-output speed ratio.

The system disclosed has many advantages. For example, the present system is capable of high input-to-output ratios of rotation. Additionally, the present system has the capability of obtaining zero speed while the system is operational or idle. Further, the system disclosed is able to be adjusted while the invention is operational.

Yet another advantage of the present system is that it has a fixed length eccentric that utilizes a dual-eccentric transmission unit. In relation to the input speed of a single eccentric versus a dual-eccentric, a dual-eccentric transmission unit allows for an increased ratio of contact between the rollers and the flexible connection member. The increased ratio of contact between the rollers and the flexible connection member provides a greater output to input speed, thereby creating an overdrive transmission unit.

Another advantage of a preferred embodiment is that the dualeccentric transmission unit has a 45° phase angle differential between eccentric units, thus allowing for more contacts with the flexible connection member and, therefore, greater output speed. Further, the present system utilizes a free-floating spring assembly in order to provide a greater angle of travel for a clutch member, in order to produce a greater output shaft rotation.

Figure 1:
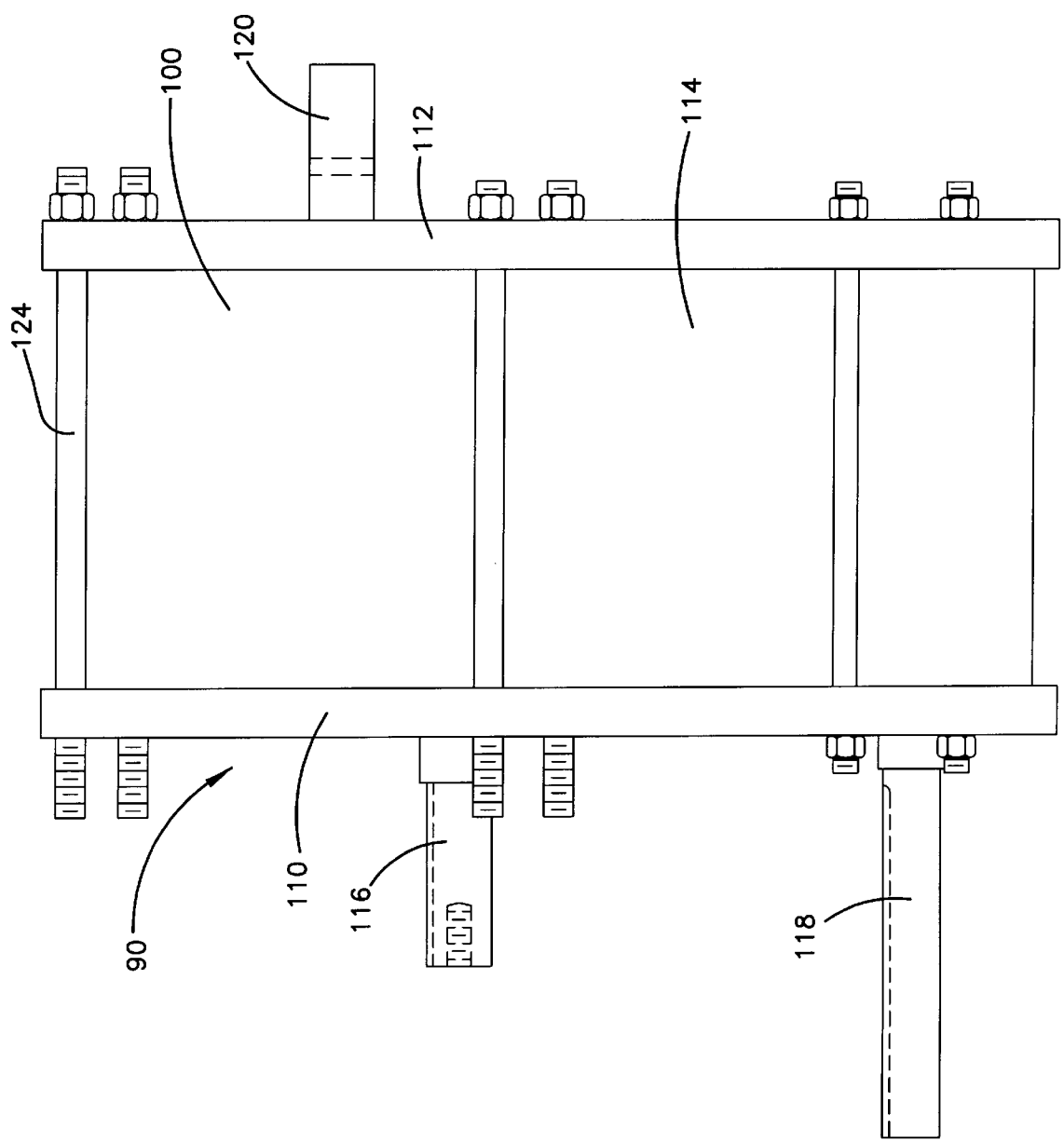
FIG. 1 is a top view showing the housing unit of the flexible link variable stroke apparatus.

Referring to FIG. 1, a flexible link variable stroke drive 90 is generally shown driven by a rotational power source, such as a motor or other suitable power source. The drive 90 may be adapted to be mounted to the frame of any type of machinery that utilizes a flexible link variable stroke drive 90.

The exterior of the flexible link variable stroke drive 90 is generally referred to as a housing 100. The housing in the embodiment shown has a first endplate 110, a second endplate 112, and an encasing plate 114. The housing rotationally supports an eccentric input shaft 116, an output shaft 118, and a control shaft 120. The armature of the motor or other rotational power source may have a key that is adapted to be coupled to the keyway of the eccentric input shaft 116. The output shaft 118 of the drive 90 may be adapted to be coupled to a pulley, shaft or other similar device.

The first 110 and second endplates 112 may have an endplate channel 122 (shown schematically in FIG. 2) located about the periphery of the first 110 and second endplates 112. The endplate channel 122 may be adapted to engage the encasing plate 114. In the embodiment shown, the first 110 and second 112 endplates in conjunction with the encasing plate 114 are rigidly coupled by a plurality of evenly spaced threaded securing rods 124 displaced throughout the periphery of the first 110 and second 112 endplates.

Figure 2:
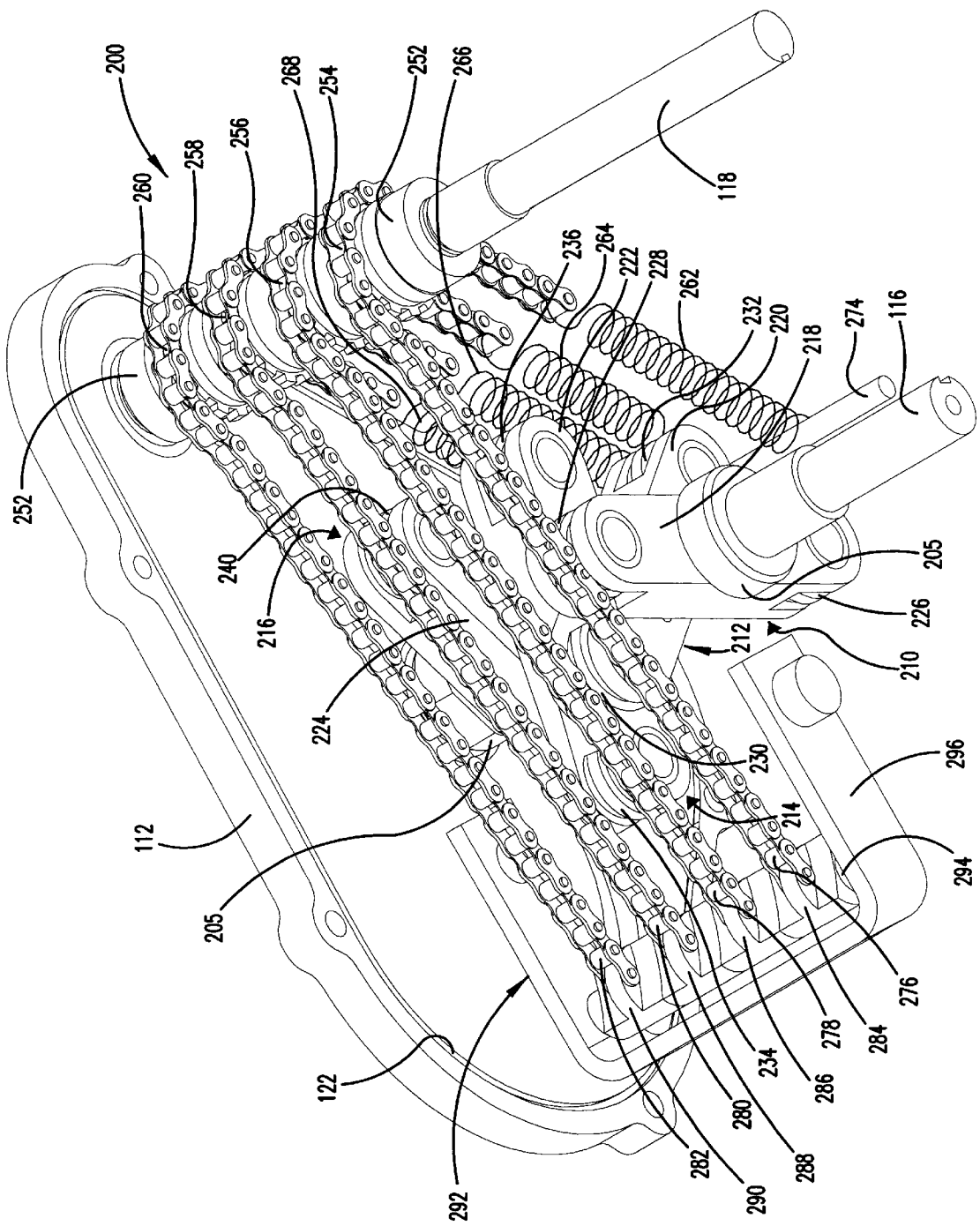
FIG. 2 is a perspective view of the flexible link variable stroke apparatus.
Figure 3:
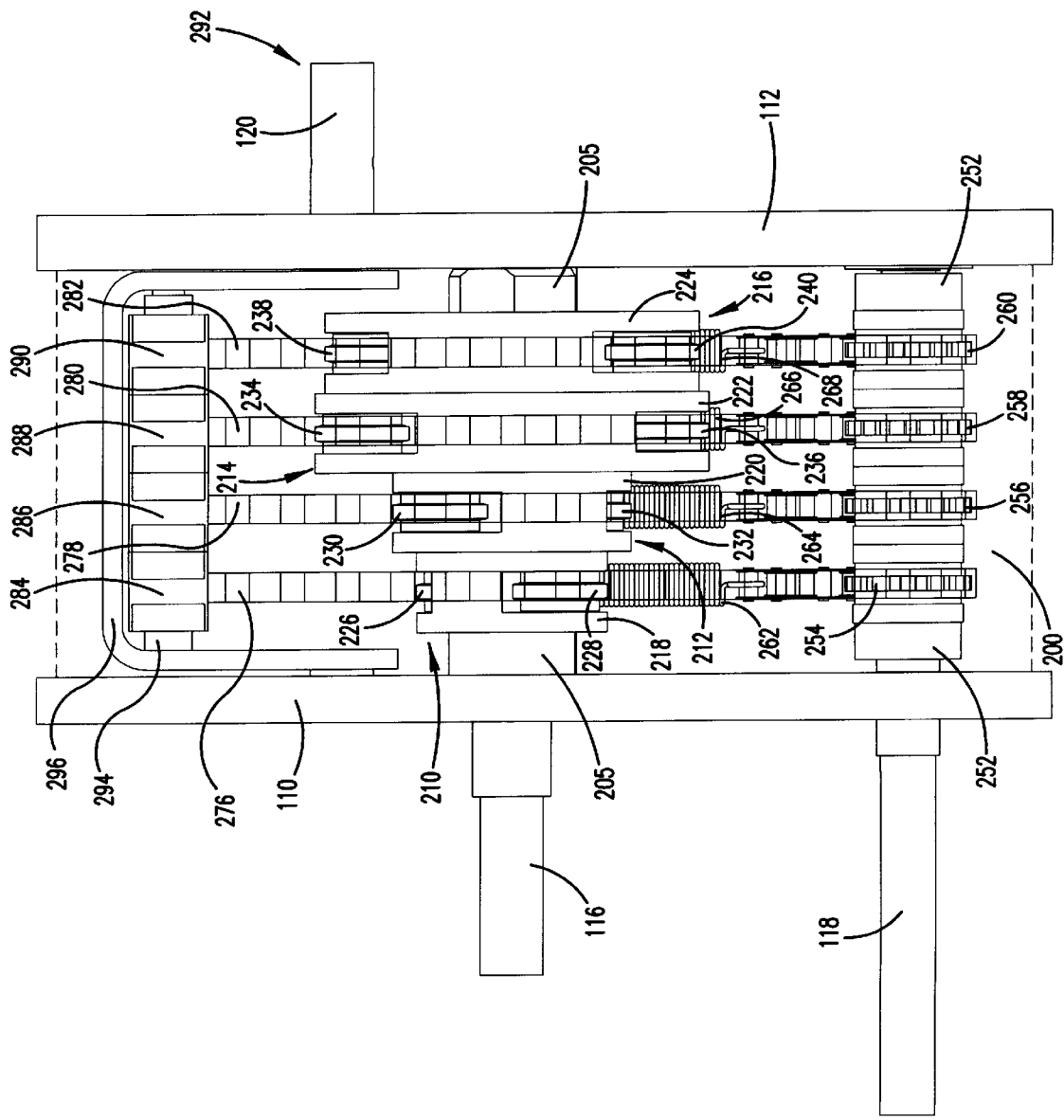
FIG. 3 is a top view of the flexible link variable stroke apparatus.

Referring to FIGS. 2 and 3, the internal structure of the flexible link variable stroke drive is generally shown as 200. The eccentric input shaft 116 is mounted between the first 110 and second 112 endplates. The eccentric input shaft 116 is shown supported by the input bearings 205 mounted in the first 110 and second 112 endplates. In the embodiment shown, the eccentric input shaft 116 has four eccentric roller assemblies 210, 212, 214, and 216 that are fixedly mounted by an interference fit. Each eccentric roller assembly 210, 212, 214 and 216 may comprise an elongated bar 218, 220, 222 and 224, as well as the input rollers 226, 228, 230, 232, 234, 236, 238, and 240 that are coupled to each respective elongated bar 218–224. Since each eccentric roller assembly may be of similar construction, the eccentric roller assembly 210 will be explained in detail for convenience. The eccentric roller assembly 210 is shown having an elongated bar 218 that has a first input roller 226 that is journaled between a first end of the elongated bar 218 that supports the bearings of the first input roller 226. Opposite the first input roller 226 is a second input roller 228 that is journaled between a second end of the elongated bar 218 that supports the bearings of the second input roller 228. The input rollers 226 and 228 have a bearing surface for engagement with the flexible connection member 276.

Figure 4:
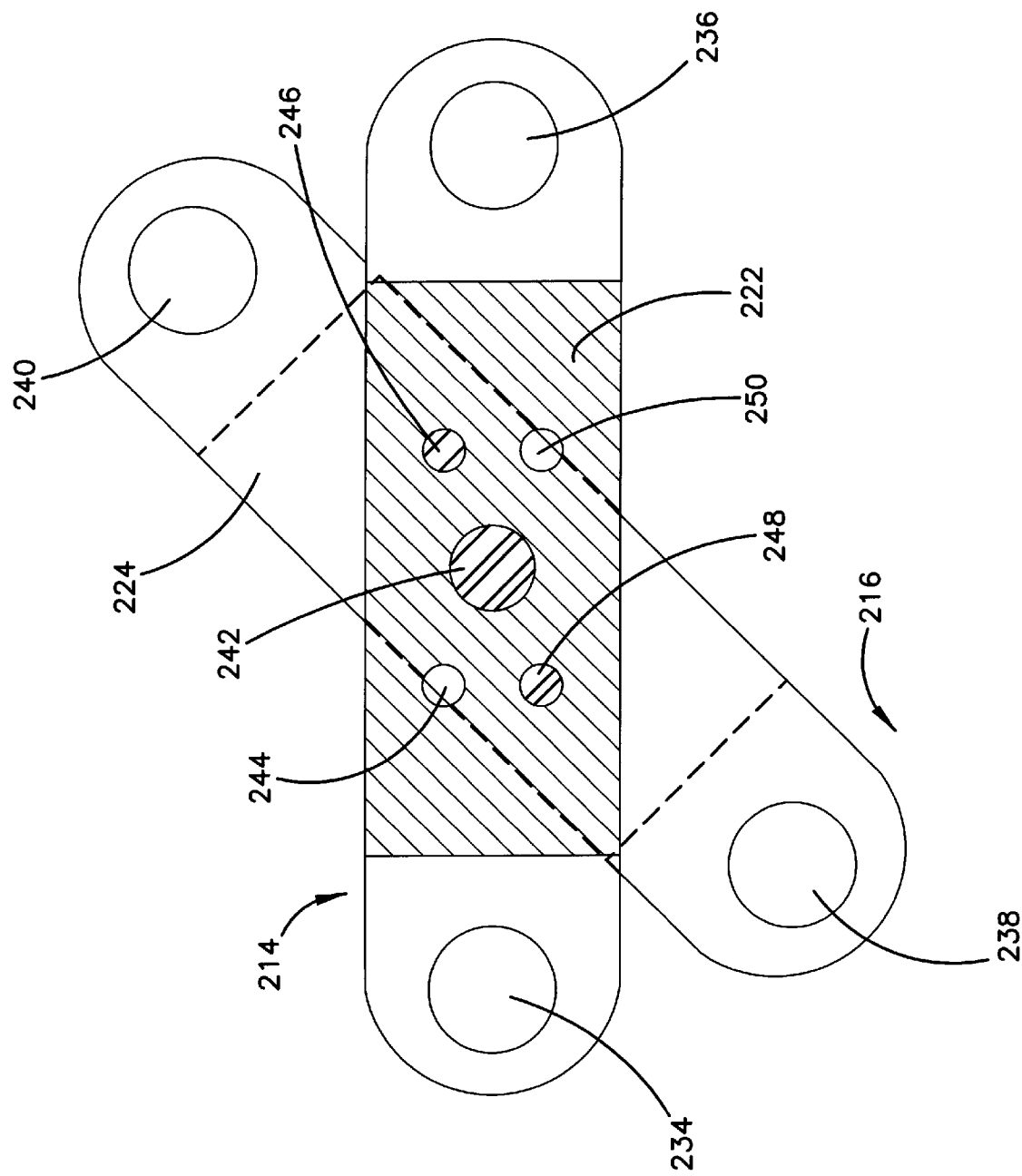
FIG. 4 is a cross-section view of the eccentric roller assemblies.

In the embodiment shown in FIG. 4, each eccentric roller assembly 210–216 are fixedly connected by an internal rod 242 through the center of each eccentric roller assembly. The eccentric roller assemblies 210–216 are configured in a 45° phase angle differential. Thus, the input rollers 226–240 connect the flexible connection members 276, 278, 280, and 282 at 45° phase angle differentials. The eccentric roller assembly may be indexed through an indexing hole pattern on each eccentric roller assembly. The indexing hole pattern shown for each has four slots 244, 246, 248, and 250. The eccentric roller assemblies 210–216 may be configured by having the slots 246 and 248 correspondingly aligned between the eccentric roller assemblies 214 and 216, thus creating a 45° angle or index between the input rollers 236 and 240, and the input rollers 234 and 238. Additionally, this configuration creates a 135° angle or index between the input rollers 236 and 238, and the input rollers 234 and 240. A pin may be inserted through the corresponding slots 246 and 248 for a permanent configuration. The eccentric roller assemblies 210 and 212 are adapted to be configured similar to the eccentric roller assemblies 214 and 216. Therefore, upon the configuration of the eccentric roller assemblies 210–216, there is a 45° phase angle differential present in the system between the input rollers 226–240. Two pins may be threaded onto the internal rod 242 for a permanent 45° angle configuration of the eccentric roller assemblies 210–216.

Referring back to FIGS. 2 and 3, the output shaft 118 is mounted between the first 110 and second 112 endplates. The output shaft 118 may be supported by output bearings 252 mounted in the first 110 and second 112 endplates. The output shaft 118 has four clutch members 254, 256, 258, and 260 that are fixedly mounted. The clutch members 254–260 utilize a sprocket construction for the transmission of rotational speed from the eccentric input shaft 116 to the output shaft 118. In the preferred embodiment, the clutch members 254–260 are one-way clutches. The one-way sprocket clutch assembly is well known to one skilled in the art, and any other suitable clutch member could be utilized with the present invention.

The clutch members 254–260 may be configured in conjunction to oscillate and drive the output shaft 118 in alternate oscillation movements from a zero to an infinitely adjustable output speed. The clutch members 254–260 may be biased by the biasing members 262, 264, 266, and 268 or tension springs. The ends of the biasing members 262–268 may be attached to a biasing member anchor 274. The biasing member anchor 274 may be supported and integrally disposed between the first 110 and second 112 endplates.

Biasing members 262–268 may be mounted on the biasing member anchor 274 in a free-floating manner for the production of a greater stroke and ultimately a higher output speed. Opposite ends of the biasing members 262–268 are attached to flexible connection members 276–282, respectively. The clutch members 254–260 may be rotated in a driving stroke by the flexible connection members 276–282. The opposite end of the flexible connection members 276–282 are connected to the flexible connection member anchors 284, 286, 288, and 290.

The flexible link variable stroke drive further includes a speed control device 292. The speed control device 292 includes a cross shaft 294, control yoke 296, and a control shaft 120. Further, the control device 292 may be adapted to be coupled to a rotation lever or other similar device for rotatably or linearly actuating the speed control device 292. The control shaft 120 may be operatively connected to the C-shaped control yoke 296. The control yoke 296 may be fixedly coupled to the cross shaft 294. The cross shaft 294 is disposed within the control yoke 296. The series of four flexible connection anchors 284, 286, 288, and 290 are pivotally coupled to the cross shaft 294. A spacer on the cross shaft 294 allows the flexible connection members 276–282 to be evenly displaced on the control shaft 120. The speed control device 292 may be configured in the specified manner in order to control the engagement of the flexible connection members to the eccentric input rollers.

Figure 5A:
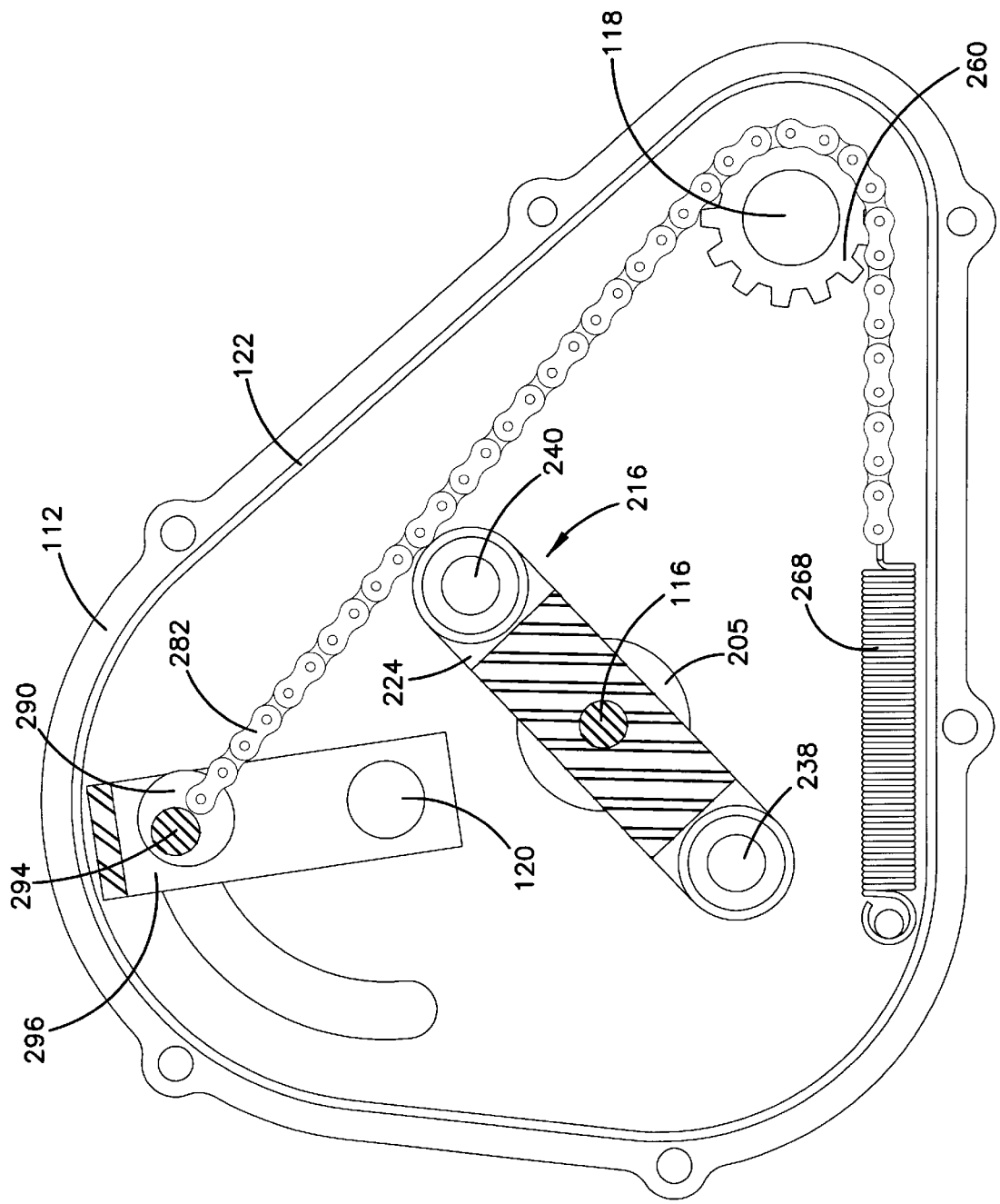
FIG. 5a is side view of the speed control device in a non-contacting position relative to a flexible link connection member.
Figure 5B:
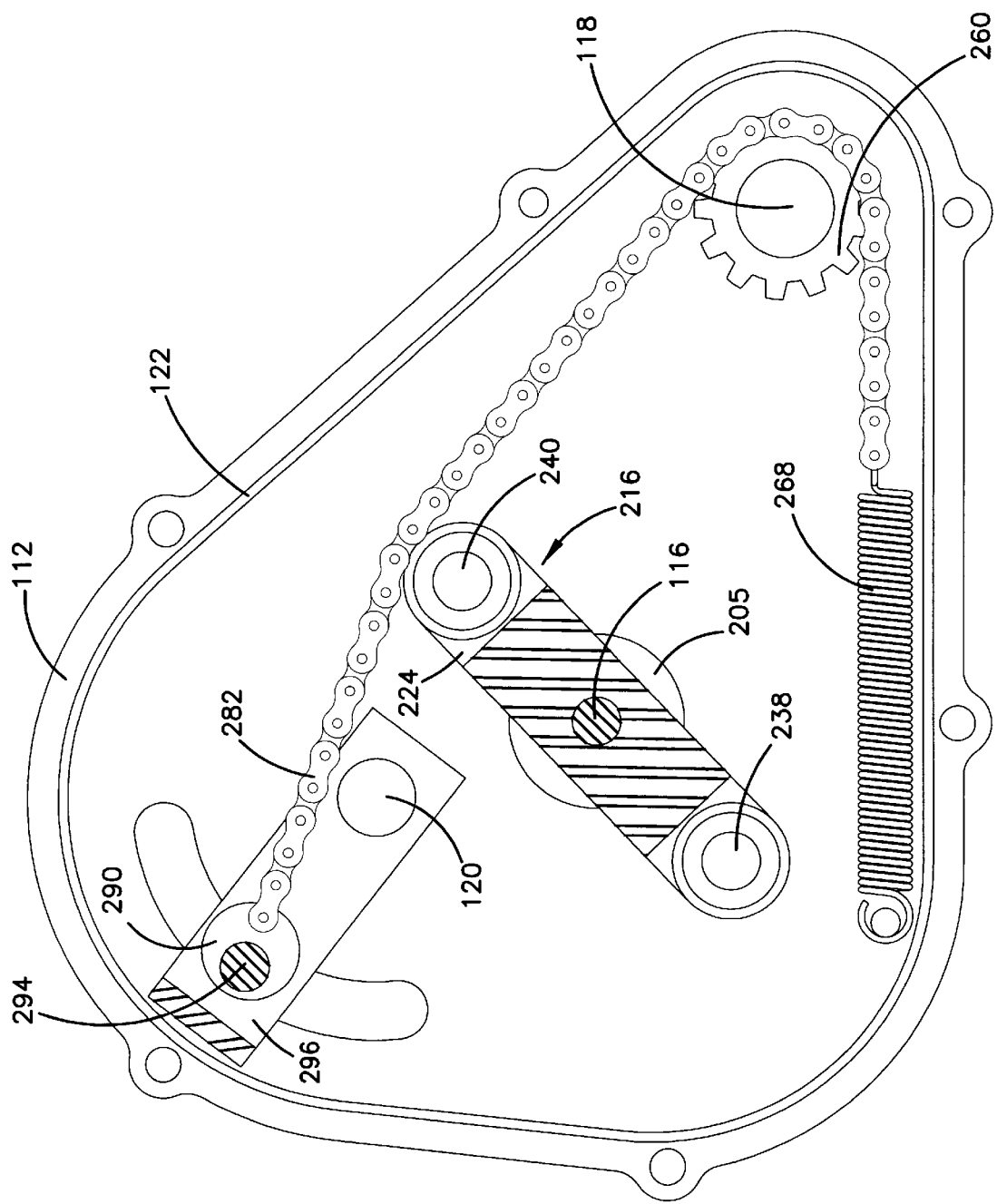
FIG. 5b is a side view of the speed control device in a intermediate contacting position relative to a flexible link connection member.
Figure 5C:
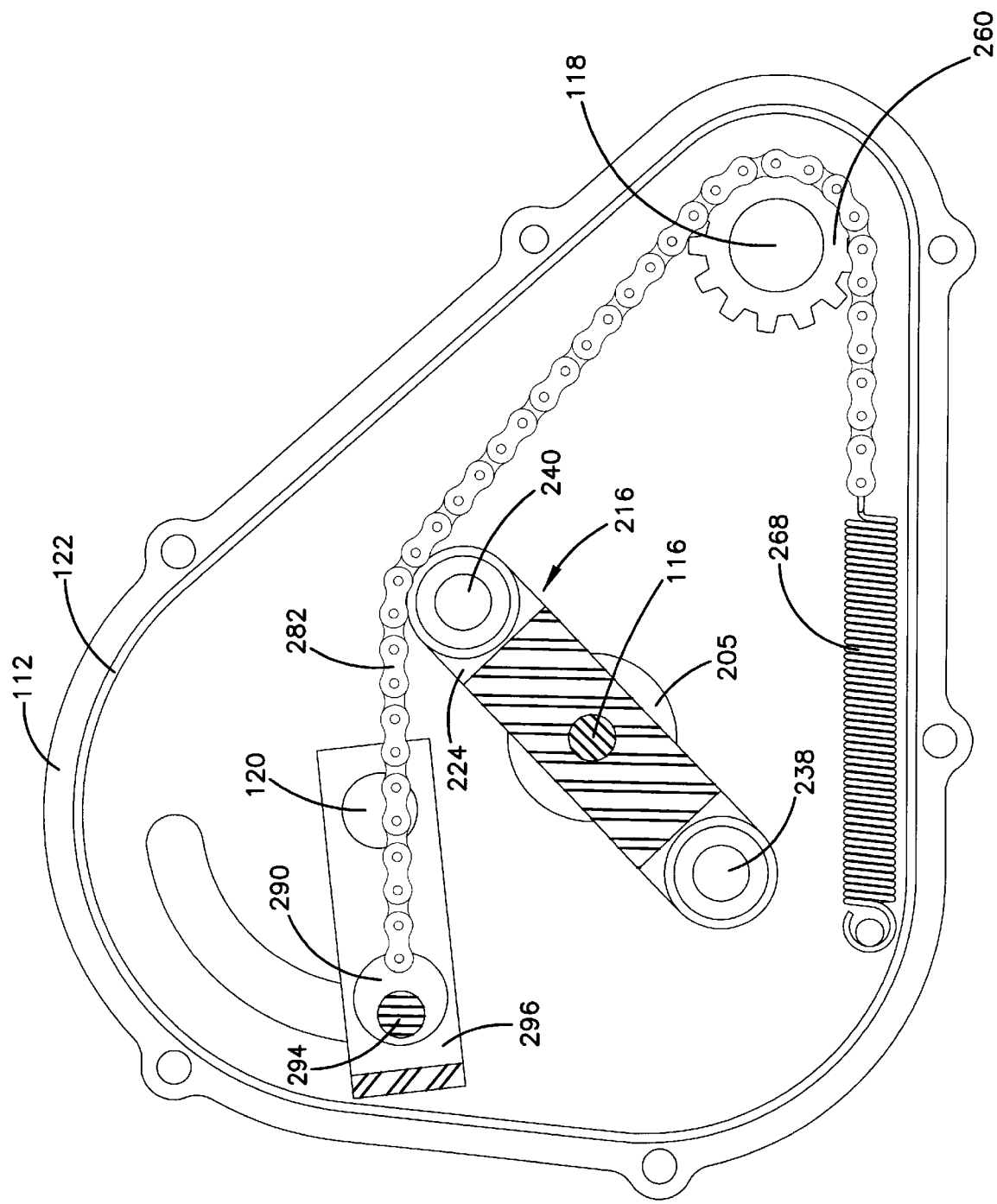
FIG. 5c is a side view of the speed control device in a fully contacting position relative to a flexible link connection member.

Referring to FIGS. 5a, 5b, and 5c, the speed control device 292 is shown in various positions corresponding to a plurality of output speeds. In FIG. 5a, the speed control device 292 is shown at a position of corresponding zero output speed. In FIG. 5b, the speed control device 292 is shown at a position of corresponding intermediate output speed. In FIG. 5c, the speed control device 292 is shown at a position of maximum output speed.

By way of the control shaft 120, the control yoke 296 may be pivotable in relation to having the flexible connection members 276–282 come into more or less contact with the input rollers, 226–240, respectively. The movement of the control yoke 296, effectuates either no deflection (as seen in FIG. 5a) or maximum deflection (as seen in FIG. 5c) of the flexible connection members 276–282 by the input rollers 226–240. Additionally, the movement of the control yoke 296, effectuates a corresponding change in speed and length of stroke of the clutch members 254–260.

Utilizing the inside face of the second endplate 112 as a point of reference, when the control yoke 296 is pivoted in the counterclockwise direction, it may move the cross shaft 294 in a direction that effectuates increased contact between the flexible connection members 276–282 and the input rollers 226–240. Further, utilizing the inside face of the second endplate 112 as a point of reference, when the control yoke 296 is pivoted in the clockwise direction, it may move the cross shaft 294 in a direction that effectuates decreased contact between the flexible connection members 276–282 and the input rollers 226–240.

Subsequently, because the motion of each eccentric roller assembly may be similar, the motion of the eccentric roller assembly 210 in conjunction with corresponding assemblies will be explained in detail. Referring to the eccentric roller assembly 210, as the eccentric input shaft 116 rotates, the input rollers 226 and 228 displace the flexible connection member 276. The displacement of the flexible connection member 276 causes the clutch member 254 to oscillate in a first direction and apply a tension force to the biasing member 262, thereby initiating movement of the biasing member 262 from its natural state. Further, the displacement of the flexible connection member 276 drives the clutch member 254 as it initiates movement of the output shaft 118 in a rotational direction.

As the eccentric input shaft 116 continues to rotate, there may be a gradual decrease in engagement of the input rollers 226 and 228 with the flexible connection member 276. Specifically referring to the engagement of the input roller 226 with the flexible connection member 276, at the period in time when the input roller 226 ceases contact with the flexible connection member 276, the biasing member 262 returns the clutch member 276 on the output shaft 118 back to its original position. Moreover, when the flexible connection member 276 leaves contact with the input roller 226, the adjacent flexible connection member 278 continues the identical motion of rotational and transitional motion. This process continues eight times per revolution giving a smooth continuous rotation of the output shaft.

The foregoing description of the present invention has been presented for purposes of illustration and description, and is not intended to be exhaustive or to limit the invention to the precise form disclosed. The description was selected to explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A flexible link drive apparatus comprising:
   a housing rotationally supporting an eccentric input shaft and an output shaft;
   an eccentric roller assembly coupled to the eccentric input shaft, the eccentric roller assembly comprising at least one input roller;
   a clutch member coupled to the output shaft; and
   a flexible connection member having a fixed end coupled to the housing through a flexible connection member anchor and a free end coupled to the housing through a biasing member, the input roller intermittently contacting the flexible connection member for rotating the clutch member and the output shaft, wherein the coupling of the free end of the flexible connection member to the housing by the biasing member causes an enhanced angle of travel for the clutch member and produces an enhanced output shaft rotation.

2. The apparatus of claim 1, further comprising a speed control device, wherein the speed control device controls the amount of engagement of the flexible connection member to the input roller.

3. The apparatus of claim 2, wherein the speed control device comprises a control shaft operatively connected to a control yoke, a cross shaft disposed within the control yoke, and a flexible connection member anchor pivotally coupled to the cross shaft, wherein the rotation of the control shaft alters the relative position of the speed control device in relation to the eccentric input roller.

4. The apparatus of claim 1, wherein the housing comprises a first endplate, a second endplate, and an encasing plate for enclosing the flexible link drive apparatus.

5. The apparatus of claim 4, wherein the eccentric input shaft is mounted between the first and the second endplate at an input location, and the output shaft is mounted between the first and the second endplate at an output location.

6. The apparatus of claim 1, wherein the eccentric roller assembly comprises an elongated bar, a first roller, and a second roller, the first roller being rotatably coupled proximate the end of the elongated bar, and the second roller being rotatably coupled proximate an opposite end of the elongated bar.

7. The apparatus of claim 6, wherein a plurality of eccentric input roller assemblies are coupled to the eccentric input shaft.

8. The apparatus of claim 7, wherein the plurality of eccentric input roller assemblies are coupled at a 45° phase angle differential.

9. The apparatus of claim 6, wherein the first and second roller assemblies have a bearing surface that engages the flexible connection member.

10. The apparatus of claim 1, wherein a plurality of clutch members are coupled to the output shaft.

11. The apparatus of claim 1, wherein the clutch member is oscillatable in a first direction and in an opposite second direction.

12. The apparatus of claim 11, wherein the clutch member has a sprocket surface for engaging the flexible connection member.

13. The apparatus of claim 1, wherein a biasing member anchor is mounted in the housing within the first and the second endplate.

14. The apparatus of claim 1, wherein the biasing member is coupled to a biasing member anchor and the flexible connection member.

15. The apparatus of claim 1, wherein the eccentric input shaft moves the eccentric input roller assembly in a first direction, and the eccentric roller assembly contacts the flexible connection member and applies a tension force to the flexible connection member.

16. The apparatus of claim 1, wherein the flexible connection member is engaged with the clutch member for driving the clutch member in a first direction.

17. The apparatus of claim 1, wherein the clutch member is coupled to the output shaft and is adapted to engage and drive the output shaft in a first direction, and the clutch member engages but does not drive the output shaft in a second direction.

18. The apparatus of claim 1, wherein the biasing member moves the clutch member, by way of the flexible connection member, in a second direction by a tension force applied to the biasing member by the flexible connection member.

19. A flexible link drive apparatus comprising:
    a housing rotationally supporting an eccentric input shaft and an output shaft;
    an eccentric roller assembly, the eccentric roller assembly having at least two diametrically opposed rollers, operatively connected to the eccentric input shaft;
    a clutch member operatively connected to the output shaft; and
    a flexible connection member having a fixed end coupled to the housing through a flexible connection member anchor and a free end coupled to the housing through a biasing member, the input roller intermittently contacting the flexible connection member for rotating the clutch member and the output shaft, wherein the coupling of the free end of the flexible connection member to the housing by the biasing member causes an enhanced angle of travel for the clutch member and produces an enhanced output shaft rotation.

20. A flexible link drive apparatus comprising:
    a housing, comprising a first endplate, a second endplate, and an encasing plate, the housing having an eccentric input shaft and an output shaft mounted between the first and second endplates;
    a plurality of eccentric roller assemblies operatively connected by a pin and a slot arrangement and coupled to the eccentric input shaft, each of the eccentric roller assemblies having at least two diametrically opposed rollers;
    a plurality of clutch members being coupled to the output shaft;
    a plurality of flexible connection members being coupled to a flexible connection member anchor and a plurality of biasing members being coupled to a biasing member anchor, the flexible connection members being in communication with the input rollers and the clutch members for variably rotating the output shaft; and
    a speed control device comprising a control shaft operatively connected to a control yoke, a cross shaft disposed within the control yoke, and a flexible connection member being pivotally coupled to the cross shaft, wherein the rotation of the control shaft alters the relative position of the speed control device in relation to the eccentric input roller.

* * * * *